(12) United States Patent
Moffat et al.

(10) Patent No.: US 7,998,649 B2
(45) Date of Patent: Aug. 16, 2011

(54) GRAFTING FUNCTIONALIZED PEARLESCENT OR METALLIC PIGMENT ONTO POLYESTER POLYMERS FOR SPECIAL EFFECT IMAGES

(75) Inventors: Karen A. Moffat, Brantford (CA); Valerie M. Farrugia, Oakville (CA); Ke Zhou, Mississauga (CA); Richard P. N. Veregin, Mississauga (CA); Cuong Vong, Hamilton (CA); Eric M. Strohm, Oakville (CA); Wafa F. Bashir, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 741 days.

(21) Appl. No.: 12/041,344

(22) Filed: Mar. 3, 2008

(65) Prior Publication Data

US 2009/0220880 A1 Sep. 3, 2009

(51) Int. Cl.
*G03G 9/00* (2006.01)
(52) U.S. Cl. ............... 430/108.6; 430/109.2; 430/111.1; 430/114; 430/137.15
(58) Field of Classification Search ............... 430/108.6, 430/109.2, 111.1, 114.4, 137.15
See application file for complete search history.

(56) References Cited

U.S. PATENT DOCUMENTS

| | | | | |
|---|---|---|---|---|
| 4,931,375 A | * | 6/1990 | Akimoto et al. | 430/109.3 |
| 5,753,392 A | | 5/1998 | Ray et al. | |
| 5,777,001 A | * | 7/1998 | Seeney et al. | 523/205 |
| 6,376,147 B1 | | 4/2002 | Bonsignore et al. | |
| 2009/0092918 A1 | * | 4/2009 | Moffat | 430/108.6 |

OTHER PUBLICATIONS

A. Finne et al., "New Functionalized Polyesters to Achieve Controlled Architectures", Journal of Polymer Science: Part A: Polymer Chemistry, 2004, vol. 42, pp. 444-452.
X. Lou et al., "Controlled Synthesis and Chemical Modification of Unsaturated Aliphatic (Co)polyesters Based on 6,7-Dihydro-2(3H)-oxepinone", Journal of Polymer Science: Part A: Polymer Chemistry, 2002, vol. 40, pp. 2286-2297.
J. J. Heikkinen et al., "Grafting of Functionalized Silica Particles With Poly(acrylic acid)", Polymers for Advanced Technologies, 2006, vol. 17, pp. 426-429.
W. Stöber et al., "Controlled Growth of Monodisperse Silica Spheres in the Micron Size Range", Journal of Colloid and Interface Science, 1968, 26, pp. 62-69.
E. Bourgeat-Lami et al., "Nucleation of Polystyrene Latex Particles in the Presence of β-Methacryloxypropyl-trimethoxysilane: Functionalized Silica Particles", Journal of Nanoscience and Nanotechnology, 2006, vol. 6 No. 2, pp. 432-444.

* cited by examiner

*Primary Examiner* — Thorl Chea
(74) *Attorney, Agent, or Firm* — Oliff & Berridge, PLC

(57) ABSTRACT

Pigment particles with at least one metal oxide surface additive, wherein the at least one metal oxide surface additive is a metal oxide particle covalently bonded with at least one polycondensation polymer, wherein the pigment particle is a pearlescent or metallic pigment.

22 Claims, 2 Drawing Sheets

US 7,998,649 B2

GRAFTING FUNCTIONALIZED PEARLESCENT OR METALLIC PIGMENT ONTO POLYESTER POLYMERS FOR SPECIAL EFFECT IMAGES

BACKGROUND

The present disclosure is related to methods of covalently attaching functionalized surface treated metallic type pigments to polyester resin for use in forming special effect images, for example using xerographic or electrophotographic printing devices.

A desired goal of electrophotography is to be able to print special effects, such as pearlescent or metallic images. While many commercial specialty pigments exist for pearlescent or metallic effects, their particle size is too large to be incorporated into electrophotographic toner particles. Median pigment sizes for commercial pearlescent/metallic pigments range from 5 to >50 microns, which is similar in size or larger than the electrophotographic toner itself. While the large particle size pigments are needed to produce special optical effects, such as metallic reflectivity, both chemical and conventional toner making processes currently available fail to incorporate these large pigments because it is currently not possible to incorporate such large pigment particles in an emulsion aggregation (EA) toner process.

One attempt to combine specialty pigments with toner is to melt-mix a specialty pigment with a toner resin. However, due to the large size of the specialty pigment, even if the toner were 20 or 30 microns in size, the pigment particles would comprise the bulk of the toner. Thus, it would be extremely difficult to jet or print toner particles including the specialty pigments, as the toner particles would end up very large. Also, with such large pigments, even a 20-30 micron toner would only have at most only a few specialty pigment particles in each particle, making the toner very inhomogeneous and the effect minimally realized. Many toner particles would have no pigment particle in them, while others would have one or merely a few pigment particles.

SUMMARY

In embodiments, described is a pigment particle with at least one metal oxide surface additive, wherein the at least one metal oxide surface additive is a metal oxide particle covalently bonded with at least one polycondensation polymer, wherein the pigment particle is a pearlescent or metallic pigment.

In further embodiments, described is a developer including a pigment particle with at least one metal oxide surface additive, wherein the at least one metal oxide surface additive is a metal oxide particle covalently bonded with at least one polycondensation polymer, wherein the pigment particle is a pearlescent or metallic pigment.

In still further embodiments, described is a method of making a special effect pigment particle including functionalizing a metal oxide surface additive on the special effect pigment particle, and covalently bonding a polycondensation polymer with the metal oxide surface additive, wherein the metal oxide surface additive is a metal oxide particle.

EMBODIMENTS

Figure 1:
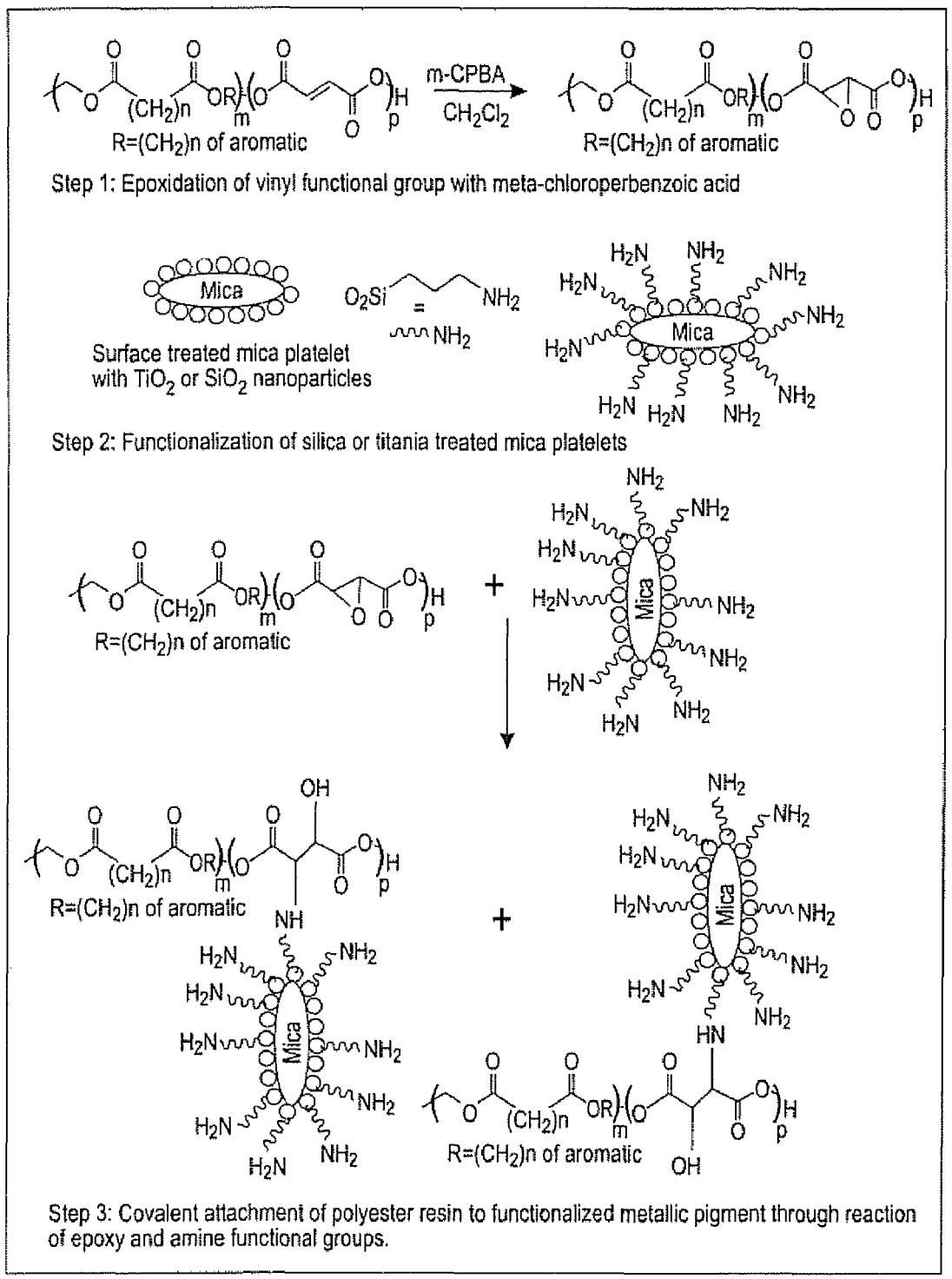
FIG. 1 is an illustrative example of an epoxy group on a polyester chain providing a reactive site for formation of a covalent bond with a primary amine as the functional group of a functionalized dioxide ($SiO_2$) nanoparticle in accordance with the present disclosure.

Described are pearlescent and metallic pigments including metal oxide surface additives covalently bonded with at least one polycondensation polymer such as polyester. One of ordinary skill in the art will appreciate that many different pearlescent and metallic pigments may be coated as described herein.

As mentioned above, specialty pigments such as pearlescent and metallic pigments are presently too large to be incorporated into other toner particles. Thus, in order to produce special effect images and to overcome the above described problems associated with these large toner size pigments, it is found by the present inventors that the pigments may be used like toner by providing a coating, for example, a resin coating on the surface of pigments to have similar charging characteristics to that of conventional toner, and thus allowing for the specialty pigments to be separately applied to a photoreceptor.

In embodiments, in order for specialty pigments to have a stronger charging quality, a coat of resin may be added to the pigments, the process of which is described in detail below. However, to ensure that the resin-coated pigments have an appropriate charge to be applied correctly, in embodiments, it may be desired to provide surface charge control additives (CCA) to provide appropriate tribo electric development transfer and/or cleaning properties. In further embodiments, a clear coat/base coat toner may be added on top of or under the resin-coated pigments. The clear coat/base coat toner improves image durability by adding additional resin that aids in fusing all of the toner/pigments together.

In embodiments, special effect pigments include metallic gold, silver, aluminum, bronze, gold bronze, stainless steel, zinc, iron, tin and copper pigments. Examples of commercially available pearlescent and metallic pigments for use herein are Merck IRIODIN 300 "Gold Pearl" and Merck IRIODIN 100 "Silver Pearl," that are mica based pigments with metal oxide particle coatings. Other such metallic color luster pigments from Merck include TIMIRON® Bronze MP60 with a D50 volume average particle size (50% of the pigments have a volume size of less than the stated size) of 22-37 microns, TIMIRON® Copper MP-65 D50 size of 22-37 microns, COLORONA® Oriental Beige D50 size of 3-10 microns, COLORONA® Aborigine Amber D50 size of 18-25 microns, COLORONA® Passion Orange with D50 size of 18-25 microns, COLORONA® Bronze Fine of D50 size of 7-14, COLORONA® Bronze with D50 size of 18-25 microns, COLORONA® Bronze Sparkle of D50 size of 28-42 microns, COLORONA® Copper Fine with D50 size of 7-14 microns, COLORONA® Copper with D50 size of 18-25, COLORONA® Copper Sparkle with D50 size of 25-39 microns, COLORONA® Red Brown with D50 size of 18-25 microns, COLORONA® Russet with D50 size of 18-25 microns, COLORONA® Tibetan Ochre with D50 size of 18-25 microns, COLORONA® Sienna Fine with D50 size of 7-14 microns, COLORONA® Sienna with D50 size of 18-25 microns, COLORONA® Bordeaux with D50 size of 18-25 microns, COLORONA® Glitter Bordeaux, COLORONA® Chameleon with D50 size of 18-25 microns. Also suitable are Merck mica based pigments with metal oxide particle coatings such as the Merck silvery white pigments including TIMIRON® Super Silk MP-1005 with D50 size of 3-10 microns, TIMIRON® Super Sheen MP-1001 with D50 size of 7-14 microns, TIMIRON® Super Silver Fine with D50 size of 9-13 microns, TIMIRON® Pearl Sheen MP-30 with D50 size of 15-21 microns, TIMIRON® Satin MP-11171 with D50 size of 11-20 microns, TIMIRON® Ultra Luster MP-111 with D50 size of 18-25 microns, TIMIRON® Star Luster MP-111 with D50 size of 18-25 microns, TIMIRON® Pearl Flake MP-10 with D50 size of 22-37 microns, TIMIRON® Super Silver with D50 size of 17-26 microns, TIMIRON® Sparkle MP-47 with D50 size of 28-38 microns, TIMIRON® Arctic Silver with D50 size of 19-25 microns, XIRONA® Silver with D50 size of 15-22 microns, and RONASTAR® Silver with D50 size of 25-45 microns.

For very bright colors, other examples from Merck include COLORONA® Carmine Red with D50 size of 10-60 microns giving a Red lustrous effect, COLORONA® Magenta with D50 size of 18-25 microns, giving a pink-violet lustrous effect, COLORONA® Light Blue with D50 size of 18-25 microns, to give a light blue lustrous effect, COLORONA® Dark Blue with D50 size of 18-25 microns to give a dark blue lustrous effect, COLORONA® Majestic Green with 18-25 microns to give a green lustrous color, COLORONA® Brilliant Green of D5 19-26 microns to give a Green-golden lustrous color, COLORONA® Egyptian Emerald of D50 18-25 microns to give a dark green lustrous effect, and COLORONA® Patagonian Purple of 18-25 microns size to give a purple lustrous effect.

In embodiments, mica based special effect pigments having a D50 from about 18 microns to about 50 microns from Eckart may also be used, such as DORADO® PX 4001, DORADO® PX 4261, DORADO® PX 4271, DORADO® PX 4310, DORADO® PX 4331, DORADO® PX 4542, PHOENIX® XT, PHOENIX® XT 2001, PHOENIX® XT 3001, PHOENIX® XT 4001, PHOENIX® XT 5001, PHOENIX® PX 1000, PHOENIX® PX 1001, PHOENIX® PX 1221, PHOENIX® PX 1231, PHOENIX® PX 1241, PHOENIX® PX 1251, PHOENIX® PX 1261, PHOENIX® PX 1271, PHOENIX® PX 1310, PHOENIX® PX 1320, PHOENIX® PX 1502, PHOENIX® PX 1522, PHOENIX® PX 1542, PHOENIX® PX 2000, PHOENIX® PX 2000 L, PHOENIX® PX 2001, PHOENIX® PX 2011, PHOENIX® PX 2011, PHOENIX® PX 2021, PHOENIX® PX 2021, PHOENIX® PX 2221, PHOENIX® PX 2231, PHOENIX® PX 2241, PHOENIX® PX 2251, PHOENIX® PX 2261, PHOENIX® PX 2271, PHOENIX® PX 3001, PHOENIX® PX 4000, PHOENIX® PX 4001, PHOENIX® PX 4221, PHOENIX® PX 4231, PHOENIX® PX 4241, PHOENIX® PX 4251, PHOENIX® PX 4261, PHOENIX® PX 4271, PHOENIX® PX 4310, PHOENIX® PX 4320, PHOENIX® PX 4502, PHOENIX® PX 4522, PHOENIX® PX 4542, PHOENIX® PX 5000, PHOENIX® PX 5001, PHOENIX® PX 5310 and PHOENIX® PX 5331.

In further embodiments, special effect pigments such as Silberline aluminum flake pigments may be used, such as 16 micron DF-1667, 55 micron DF-2750, 27 micron DF-3500, 35 micron DF-3622, 15 micron DF-554, 20 micron DF-L-520AR, 20 micron LED-1708AR, 13 micron LED-2314AR 55 micron SILBERCOTE™ PC 0452Z, 47 micron SILBERCOTE™ PC 1291X, 36 micron SILBERCOTE™, 36 micron SILBERCOTE™ PC 3331X, 31 micron SILBERCOTE™ PC 4352Z, 33 micron SILBERCOTE™ PC 4852Z, 20 micron SILBERCOTE™ PC 6222X, 27 micron SILBERCOTE™ PC 6352Z, 25 micron SILBERCOTE™ PC 6802X, 14 micron SILBERCOTE™ PC 8152Z, 14 micron SILBERCOTE™ PC 8153X, 16 micron SILBERCOTE™ PC 8602X, 20 micron SILVET®/SILVEX® 890 Series, and 16 micron SILVET®/SILVEX® 950 Series.

In embodiments, pearlescent and metallic pigments may be mica flakes coated with titanium dioxide or other transition metal oxides, such as $Al_2O_3$, $Fe_2O_3$, $Fe_3O_4$, $SnO_2$, $Cr_2O_3$ or a combination of two or more transition metal oxides. In embodiments, additional colorant may also be optionally added to the metallic pigment, such as carmine or ferric ferrocyanide.

In embodiments, the base pigment has a volume average size range of from about 5 µm to about 50 µm, for example from about 8 µm to about 30 µm. The pigment size may be measured using any suitable device, for example a Coulter Counter as known in the art.

In embodiments, the metal oxide particles are nanosized metal oxide particles that range in size from about 3 to about 700 nm, for example, from about 10 nm to about 500 nm, with non-spacer metal oxide particles desirably having a size of from about 10 to about 50 nm, and the spacer metal oxide particles being larger nanosized particles, for example, from about 100 nm to about 700 nm, in volume average size.

Metallic oxide coated pigments can be purchased from pigment manufacturers as metal oxide coated mica pigments from Sun Chemical or as coated pearl or metallic coated pearl pigments from a metallic pigment manufacturer Creation of Quality Value (CQV). The metal oxide coatings may be any metal oxide, such as silicon dioxide ($SiO_2$) or titanium dioxide ($TiO_2$). The base pigment may typically be mica.

In embodiments, a method may be used to surface treat mica platelets with metal oxide particles, such as ($SiO_2$) or ($TiO_2$) nanoparticles.

The metal oxide particles of the coating may then be functionalized, followed by grafting the functionalized metal oxides onto polycondensation polymers such as polyester resins.

As mentioned above, while many commercial specialty pigments exist for pearlescent or metallic effects, their particle size is too large to be incorporated into electrophotographic toner particles, and thus toner making processes currently available fail to incorporate these large pigments because it is currently not possible to incorporate such large pigment particles in an EA toner process. In embodiments, described are toner size pigment particles provided with charging characteristics to provide pigment particles that are "toner-like," that is, the pigment particles may be applied as toner due to the charging characteristics. This charging characteristic is achieved herein by way of coating the pigment particles with the metal oxide particles covalently bonded with resin and/or by applying additional surface additives, such as charge control additives, to the pigment particles.

In embodiments, the pigment particles may be provided in conjunction with a resin coating to provide desired electrification property and environmental stability to the pigment. The resins used in the coating may be positively charging for electrophotographic development systems that require positively charged toner, or the resins may be negatively charging for electrophotographic development systems that require negatively charged toner.

For positively charging toners, examples of resins that may be used in the coating include crosslinked resins, such as phenolic resin and melamine resin, and thermoplastic resin, such as polyethylene and polymethyl methacrylate, and thus would be applicable to pearlescent or metallic toners that are positively charging.

For negatively charging toners, examples of a negatively charging resin that could be used in the coating are amorphous and crystalline polyester resins. In embodiments, at least one of the polyester resins in the coating would have a moderate high acid value. A "moderate high acid value" may be, for example, an acid value of from about 13 mg/eq. KOH to about 40 mg/eq. KOH, for example, from about 15 mg/eq. KOH to about 35 mg/eq. KOH, or such as from about 15 mg/eq. KOH to about 25 mg/eq. KOH. The acid value may be determined by titration method using potassium hydroxide as a neutralizing agent with a pH indicator. Resins with acid values of about 6 mg/eq. KOH to about 13 mg/eq. KOH may also be used in the coatings. Polyester resins with low acid value, such as less than 6 mg/eq. KOH, may also be used in combination with a higher acid value resin, for example greater than 16 mg/eq. KOH, in the coating, or with a negative charge control additive (CCA). In embodiments, with an appropriate positive CCA, polyesters may be used for positive charging systems as well.

In embodiments, the polyester resin may be synthesized to have moderate high acid values, for example, moderate high carboxylic acid values. The polyester resin may be made to have a moderate high acid value by using an excess amount of diacid monomer over the diol monomer, or by using acid anhydrides to convert the hydroxyl ends to acidic ends, for example by reaction of the polyester with known organic anhydrides such as trimellitic anhydride, phthalic anhydride, dodecyl succinic anhydride, maleic anhydride, 1,2,4,5-benzenedianhydride 5-(2,5-dioxotetrahydrol)-3-methyl-3-cyclohexene-1,2-dicarboxylic anhydride, 5-(2,5-dioxotetrahdrol)-4-methyl-3-cyclohexene-1,2-dicarboxylic anhydride, pyromellitic dianhydride, benzophenone dianhydride, biphenyl dianhydride, bicyclo[2.2.2]-oct-7-ene tetracarboxylic acid dianhydride, cis,cis,cis,cis, 1,2,3,4-cyclopentane tetracarboxylic acid dianhydride, ethylenediamine tetracetic acid dianhydride, 4,4'-oxydiphthalic anhydride, 3,3',4,4'-diphenylsulfone tetracarboxylic dianhydride, ethylene glycol bis-(anhydro-trimellitate), propylene glycol bis-(anhydro-trimellitate), diethylene glycol bis-(anhydro-trimellitate), dipropylene glycol bis-(anhydro-trimellitate), triethylene glycol bis-(anhydro-trimellitate), tripropylene glycol bis-(anhydro-trimellitate), tetraethylene glycol bis-(anhydro-trimellitate), glycerol bis-(anhydro-trimellitate), and mixtures thereof. The amount of polymer coat may vary. However, the polymer coat should be in a sufficient amount to provide a complete monolayer coverage, for example, about 5 nm thick or more.

Alternatively, a hydroxyl terminated polyester resin may be converted to a high acid value polyester resin by reacting with multivalent polyacids, such as 1,2,4-benzene-tricarboxylic acid, 1,2,4 cyclohexanetricarboxylic acid, 2,5,7-naphthalenetricarboxylic acid, 1,2,4 naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid; acid anhydrides of multivalent polyacids; and lower alkyl esters of multivalent polyacids; multivalent polyols, such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2 methyl-propanetriol, 2-methyl-1,2,4-butanetriol, trimethylolethane, trimethylolpropane, 1,3,5 trihydroxymethylbenzene, mixtures thereof, and the like.

In embodiments, the polyester may be, for example, poly (1,2-propylene-diethylene) terephthalate, polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexalene-adipate polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate, polyethylene-pimelate, polypropylene-pimelate, polybutylene-pimelate, polypentylene-pimelate, polyhexalene-pimelate, polyheptadene-pimelate, poly (propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), poly(1,2-propylene fumarate), poly (propoxylated bisphenol co-maleate), poly(ethoxylated bisphenol co-maleate), poly(butyloxylated bisphenol co-maleate), poly(co-propoxylated bisphenol co ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co ethoxylated bisphenol co-itaconate), poly(1,2-propylene itaconate), or mixtures thereof.

The onset Tg (glass transition temperature) of the amorphous polyester resin may be from about 53° C. to about 70° C., such as from about 53° C. to about 67° C. or from about 56° C. to about 60° C. The melting temperature of the crystalline polyester resin may be from about 60° C. to about 90° C., such as from about 70° C. to about 80° C. The Ts (softening temperature) of the polyester resin, that is, the temperature at which the polyester resin softens, may be from about 90° C. to about 135° C., such as from about 95° C. to about 130° C. or from about 105° C. to about 125° C., which is also applicable to positive polymers.

In embodiments, the resin is an amorphous polyester. Examples of amorphous polyester resins include branched polyester resins and linear polyester resins.

The branched amorphous polyester resins are generally prepared by the polycondensation of an organic diol, a diacid or diester, and a multivalent polyacid or polyol as the branching agent and a polycondensation catalyst.

Examples of diacid or diesters selected for the preparation of amorphous polyesters include dicarboxylic acids or diesters selected from, for example, of terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The organic diacid or diester may comprise, for example, from about 45 to about 52 mole percent of the resin.

Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl)oxide, dipropylene glycol, dibutylene, and mixtures thereof. The amount of organic diol selected may vary, and more specifically, is, for example, from about 45 to about 52 mole percent of the resin.

Branching agents to generate a branched amorphous polyester resin include, for example, a multivalent polyacid such as 1,2,4-benzene-tricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetriol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the resin.

The amorphous resin may possess, for example, a number average molecular weight ($M_n$), as measured by gel permeation chromatography (GPC), of from about 10 to about 500,000, and for example from about 5,000 to about 250,000; a weight average molecular weight ($M_w$) of, for example, from about 20,000 to about 600,000, and for example from about 7,000 to about 300,000, as determined by GPC using polystyrene standards; and wherein the molecular weight distribution ($M_w/M_n$) is, for example, from about 1.5 to about 6, and more specifically, from about 2 to about 4.

In embodiments, the resin is a crystalline polyester. Illustrative examples of crystalline polyesters include any of various polyesters, such as poly(ethylene-adipate), poly(propylene-adipate), poly(butylene-adipate), poly(pentylene-adipate), poly(hexylene-adipate), poly(octylene-adipate), poly(nonylene-adipate), poly(decylene-adipate), poly(undecylene-adipate), poly(ododecylene-adipate), poly(ethylene-glutarate), poly(propylene-glutarate), poly(butylene-glutarate), poly(pentylene-glutarate), poly(hexylene-glutarate), poly(octylene-glutarate), poly(nonylene-glutarate), poly(decylene-glutarate), poly(undecylene-glutarate), poly(ododecylene-glutarate), poly(ethylene-succinate), poly(propylene-succinate), poly(butylene-succinate), poly(pentylene-succinate), poly(hexylene-succinate), poly(octylene-succinate), poly(nonylene-succinate), poly(decylene-succinate), poly(undecylene-succinate), poly(ododecylene-succinate), poly(ethylene-pimelate), polypropylene-pimelate), poly(butylene-pimelate), poly(pentylene-pimelate), poly(hexylene-pimelate), poly(octylene-pimelate), poly(nonylene-pimelate), poly(decylene-pimelate), poly(undecylene-pimelate), poly(ododecylene-pimelate), poly(ethylene-sebacate), poly(propylene-sebacate), poly(butylene-sebacate), poly(pentylene-sebacate), poly(hexylene-sebacate), poly(octylene-sebacate), poly(nonylene-sebacate), poly(decylene-sebacate), poly(undecylene-sebacate), poly(ododecylene-sebacate), poly(ethylene-azelate), poly(propylene-azelate), poly(butylene-azelate), poly(pentylene-azelate), poly(hexylene-azelate), poly(octylene-azelate), poly(nonylene-azelate), poly(decylene-azelate), poly(undecylene-azelate), poly(ododecylene-azelate), poly(ethylene-dodecanoate), poly(propylene-dodecanoate), poly(butylene-dodecanoate), poly(pentylene-dodecanoate), poly(hexylene-dodecanoate), poly(octylene-dodecanoate), poly(nonylene-dodecanoate), poly(decylene-dodecanoate), poly(undecylene-dodecanoate), poly(ododecylene-dodecanoate), poly(ethylene-fumarate), poly(propylene-fumarate), poly(butylene-fumarate), poly(pentylene-fumarate), poly(hexylene-fumarate), poly(octylene-fumarate), poly(nonylene-fumarate), poly(decylene-fumarate), poly(undecylene-fumarate), poly(ododecylene-fumarate), copoly-(butylene-fumarate)-copoly-(hexylene-fumarate), copoly-(ethylene-dodecanoate)-copoly-(ethylene-fumarate), mixtures thereof, and the like.

Other examples of crystalline materials include polyolefins, such as polyethylene, polypropylene, polypentene, polydecene, polydodecene, polytetradecene, polyhexadecene, polyoctadene, and polycyclodecene, polyolefin copolymers, mixtures of polyolefins, bi-modal molecular weight polyolefins, functional polyolefins, acidic polyolefins, hydroxyl polyolefins, branched polyolefins, for example, such as those available from Sanyo Chemicals of Japan as VISCOL 550P™ and VISCOL 660P™, Mitsui "Hi-wax" NP055 and NP105, or wax blends such as MicroPowders, Micropro-440 and 440w. In embodiments, the crystalline polyolefin may be maleated olefins, such as CERAMER (Baker Hughes).

The crystalline resin may possess a melting point of, for example, from at least about 60° C., or for example, from about 70° C. to about 90° C., and a number average molecular weight ($M_n$), as measured by gel permeation chromatography (GPC) of, for example, from about 1,000 to about 50,000, or from about 2,000 to about 25,000, with a weight average molecular weight ($M_w$) of, for example, from about 2,000 to about 100,000, or from about 3,000 to about 80,000, as determined by GPC using polystyrene standards. The molecular weight distribution ($M_w/M_n$) of the crystalline resin is, for example, from about 2 to about 6, and more specifically, from about 2 to about 4.

In embodiments, a surface of the metal oxide particles may need to be functionalized in order to covalently bond with the polymer coating. This functionalization ensures the presence of functional groups that are needed for bonding the polymer coat on the surface of the metal oxides. Although several different methods to functionalize metal oxide surfaces are within the scope of the present disclosure, in embodiments, potential functional groups, such as an amine, a hydroxyl, an epoxide, or a carboxylic acid on a polyester chain may be implemented provided that during post polymer functionalization, the polymer chains are not degraded to reduce the chain length. In further embodiments, various reagents may be used to functionalize the surface of a metal oxide, whereby upon addition of two components (as shown in Example 1, below), the metal oxides become attached to the polyester resin. This, in turn, will result in exposed amine or epoxy functional groups available for further reaction such as, for example, grafting of 3-aminopropyl-functionalized silica particles or 3-glycidoxypropyl-functionalized silica particles onto poly(acrylic acid). Silica particles may be modified with a silane coupling agent such as γ-methacryloxypropyl-trimethoxysilane containing a vinyl end group that is subsequently co-polymerized with styrene by emulsion polymerization to generate silica/polystyrene nanocomposite particles.

In embodiments, a polymer chain may also need to be functionalized to provide a reactive site for the functionalized sites on the metal oxide surface. The polymer chain may be functionalized with an epoxide group. Functionalizing a polymer chain with an epoxide group involves reacting a vinyl group in a backbone of a polymer chain with meta-chloroperoxybenzoic acid (mCPBA). Epoxidation may then carried out in 0.6 molar dichloromethane with 2.0 molar equivalents of meta-chloroperoxybenzoic acid based on the content of unsaturated units in the polymer. The reaction may be conducted under stirring at room temperature and the reaction proceeds until all of the double bonds are converted into epoxide groups. After filtration of the precipitated polymer, the filtrate is precipitated in cold hexane to obtain the epoxidized polymer. The surface functionalized metal oxide particles are then covalently bonded to a polycondensation polymer by any suitable reaction. Any of the amorphous and crystalline polymers described above may be used as the polycondensation polymer to be grafted to the metal oxides. However, the polymer chain may be appropriately functionalized in any known manner to provide a reactive site with the functionalized sites on the metal oxide surface.

For example, where the metal oxide is functionalized with amine groups, the polymer chain may be functionalized with epoxide groups. Two examples of functionalized pairs are amines reacted with epoxides (that is, functionalize the metal oxide with the amine to graft with the epoxy group of the polymer or vice versa) and epoxides reacted with carboxylic acids (that is, functionalize the metal oxide with the epoxy group and graft with the carboxylic acid, of the polymer or vice versa).

An example of a process for grafting a polycondensation polyester polymer to functionalized surface metal oxide mica particles is as follows:

A step of an epoxidation of a vinyl functional group in a polyester resin, which is thereafter reacted with meta-chloroperbenzoic acid (mCPBA) to generate an epoxide. This reaction may be performed in a solvent, such as dichloromethane or toluene, after isolation of the polymer. This reaction may be conducted under stirring at room temperature or slightly elevated temperatures up to 50° C. until a double-bond conversion is complete. After the reaction is complete, the polymer is precipitated in cold hexane to obtain an epoxidized polymer.

A step of functionalizing the metallic oxide coated mica pigment, that is a silica or titania particle on the mica pigment surface, with an amine functional group, may be achieved by preparing sol-gel silica nanoparticles by co-condensation directly in the presence of an amine containing component. For example, tetraethoxysilane (TEOS) or tetramethoxysilane (TMOS) is mixed with either (3-aminopropyl) trimethoxysilane or (3-aminopropyl)triethoxysilane in a molar ratio of 0.85 to 0.15 with appropriate amounts of ethanol (or methanol), water and ammonia to prepare the amine containing component. The solution is then stirred for a period of time of about 2 to about 10 hours at room temperature. This action results in an exposed amine or carboxylic acid or epoxide group on a pigment surface available for subsequent reactions.

A step of coupling the amine functionalized metallic oxide coated mica pigment to the epoxidized polyester resin. The epoxidized resin is dissolved in an appropriate solvent such as dimethylformamide and the solution is bubbled with nitrogen to produce an inert atmosphere to which is added the amine functionalized silica particles. The mixture is then stirred for about 24 hours at an elevated temperature of about 70° C. After cooling the mixture to room temperature, the grafted polymer is filtered and washed to remove organic impurities and unreacted silica and polymer.

The pigment coated with metal oxide particles covalently bonded with polycondensation polymer may be stably dispersed in water using a phase inversion process. The pigment particles may also be dried and blended with additional conventional surface additives to enable the use of the pigments like toner particles.

In embodiments, external additives may be used on the resin coated or CCA coated pigment. For example, toner particles may be blended with an external additive package using a blender such as a Henschel blender. External additives are additives that associate with the surface of the pigment particles. Suitable external additives include external additives used in the art in electrophotographic toners. In embodiments, the external additive package may include one or more of silicon dioxide or silica ($SiO_2$), titania or titanium dioxide ($TiO_2$), and cerium oxide. Silica may be a first silica and a second silica. The first silica may have an average primary particle size, measured in diameter, in the range of, for example, from about 5 nm to about 50 nm, such as from about 5 nm to about 25 nm or from about 20 nm to about 40 nm. The second silica may have an average primary particle size, measured in diameter, in the range of for example, from about 100 nm to about 200 nm, such as from about 100 nm to about 150 nm or from about 125 nm to about 145 nm. The second silica external additive particles have a larger average size (diameter) than the first silica. The titania may have an average primary particle size in the range of, for example, about 5 nm to about 50 nm, such as from about 5 nm to about 20 nm or from about 10 nm to about 50 nm. The cerium oxide may have an average primary particle size in the range of, for example, about 5 nm to about 50 nm, such as from about 5 nm to about 20 nm or from about 10 nm to about 50 nm.

Zinc stearate may also be used as an external additive. Calcium stearate and magnesium stearate may provide similar functions. Zinc stearate may have an average primary particle size in the range of, for example, about 500 nm to about 700 nm, such as from about 500 nm to about 600 nm or from about 550 nm to about 650 nm.

In embodiments, the coating alone may not provide adequate charging or charge control. That is, the resin coat alone may not provide enough electric charge for the pigment particles to perform adequately in a xerographic or electrophotographic process utilizing a photoreceptor. In such embodiments, a charge control additive (CCA) as above may be added to the resin coating.

In embodiments, the resin coated pigment particles may be incorporated into a developer composition. The developer compositions disclosed herein may be selected for electrophotographic, especially xerographic, imaging and printing processes, including digital processes. The developer may be used in image development systems employing any type of development scheme without limitation, including, for example, conductive magnetic brush development (CMB), which uses a conductive carrier, insulative magnetic brush development (IMB), which uses an insulated carrier, semiconductive magnetic brush development (SCMB), which uses a semiconductive carrier, etc. Other options are to use no carrier with the pigment particles in a single-component development system (SCD). In embodiments, the developers are used in SCMB development systems.

Illustrative examples of carrier particles that may be selected for mixing with the toner composition prepared in accordance with the present disclosure include those particles that are capable of triboelectrically obtaining a charge of opposite polarity to that of the toner particles. Illustrative examples of suitable carrier particles include granular zircon, granular silicon, glass, steel, nickel, ferrites, magnetites, iron ferrites, silicon dioxide, and the like. Additionally, there can be selected as carrier particles nickel berry carriers, comprised of nodular carrier beads of nickel, characterized by surfaces of reoccurring recesses and protrusions thereby providing particles with a relatively large external area.

In embodiments, selected carrier particles may be used with or without a coating, the coating generally being comprised of fluoropolymers, such as polyvinylidene fluoride resins, terpolymers of styrene, methyl methacrylate, a silane, such as triethoxy silane, tetrafluorethylenes, other known coatings and the like. In embodiments, the carrier coating may comprise polymethyl methacrylate, copoly-trifluoroethyl-methacrylate-methyl methacrylate, polyvinylidene fluoride, polyvinylfluoride copolybutylacrylate methacrylate, copoly perfluorooctylethylmethacrylate methylmethacrylate, polystyrene, or a copolymer of trifluoroethyl-methacrylate and methylmethacrylate containing a sodium dodecyl sulfate surfactant. The coating may include additional additives such as a conductive additive, for example carbon black.

In further embodiments, the carrier core is partially coated with a polymethyl methacrylate (PMMA) polymer having a weight average molecular weight of 300,000 to 350,000 commercially available from Soken. The PMMA may be an electropositive polymer in that the polymer that will generally impart a negative charge on the toner with which it is contacted.

The PMMA may optionally be copolymerized with any desired comonomer, so long as the resulting copolymer retains a suitable particle size. Suitable comonomers may include monoalkyl, or dialkyl amines, such as a dimethylaminoethyl methacrylate, diethylaminoethyl methacrylate, diisopropylaminoethyl methacrylate, or t-butylaminoethyl methacrylate, and the like.

In embodiments, the polymer coating of the carrier core is comprised of PMMA, such as PMMA applied in dry powder form and having an average particle size of less than 1 micrometer, such as less than 0.5 micrometers, that is applied (melted and fused) to the carrier core at higher temperatures on the order of 220° C. to 260° C. Temperatures above 260° C. may adversely degrade the PMMA. Triboelectric tunability of the carrier and developers herein is provided by the temperature at which the carrier coating may be applied, higher temperatures resulting in higher tribo up to a point beyond which increasing temperature acts to degrade the polymer coating and thus lower tribo.

In embodiments, carrier cores with a diameter of, for example, about 5 micrometers to about 100 micrometers may be used. More specifically, the carrier cores are, for example, about 20 micrometers to about 60 micrometers. Most specifically, the carriers are, for example, about 30 micrometers to about 50 micrometers. In embodiments, a 35 micrometer ferrite core available from Powdertech of Japan is used. The ferrite core may be a proprietary material believed to be a strontium/manganese/magnesium ferrite formulation.

In embodiments, polymer coating coverage may be, for example, from about 30 percent to about 100 percent of the surface area of the carrier core with about a 0.1 percent to about a 4 percent coating weight. Specifically, about 75 percent to about 98 percent of the surface area is covered with the micropowder by using about a 0.3 percent to about 1.5 percent coating weight. The use of smaller-sized coating powders may be advantageous as a smaller amount by weight of the coating may be selected to sufficiently coat a carrier core. The use of smaller-sized coating powders also enables the formation of thinner coatings. Using less coating is cost effective and results in less coating amount separating from the carrier to interfere with the triboelectric charging characteristics of the toner and/or developer.

In further embodiments, the pigments may be used in combination with a clear (substantially colorless) toner material. Such clear toners are comprised of toner materials without a colorant, such as pigment, dye, mixtures of pigments, mixture of dyes, mixtures of pigments and dyes, and the like. The clear toners may be any suitable toner, including conventional toners or emulsion aggregation toners.

In embodiments, the clear toner may be prepared using any toner resin discussed above. The toner may include a binder in the form of a clear resin toner, for example such as polyesters, polyvinyl acetals, vinyl alcohol-vinyl acetal copolymers, polycarbonates, styrene-alkyl alkyl acrylate copolymers and styrene-aryl alkyl acrylate copolymers, styrene-diene copolymers, styrene-maleic anhydride copolymers, styrene-allyl alcohol copolymers, mixtures thereof and the like. The toner may also include charge control additives such as alkyl pyridinium halides, cetyl pyridinium chloride, cetyl pyridinium tetrafluoroborates, quaternary ammonium sulfate and sulfonate compounds, such as distearyl dimethyl ammonium methyl sulfate, and surface additives such as straight silica, colloidal silica, UNILIN, polyethylene waxes, polypropylene waxes, aluminum oxide, stearic acid, polyvinylidene fluoride, and the like.

In embodiments, pigments may be mixed with clear toner and applied simultaneously to a substrate from a same housing. In further embodiments, clear toner may be applied before or after application of the pigment to a substrate from a separate housing to assist in securing the pigment of the substrate.

In embodiments, a clear topcoat may be added to an image with pigments, with or without clear toner, for toughness/surface resistance.

In embodiments, the topcoat may be an UV curable topcoat. The UV curable topcoat or overcoat may comprise, for example, at least one radiation curable oligomer and/or monomer, at least one photoinitiator, and optionally at least one wax. Suitable UV curable oligomers include acrylated polyesters, acrylated polyethers, acrylated epoxies, and urethane acrylates. Examples of suitable acrylated oligomers include acrylated polyester oligomers, such as EB 81 (UCB Chemicals), CN2200 (Sartomer Co.), CN2300 (Sartomer Co.), and the like, acrylated urethane oligomers, such as EB270 (UCB Chemicals), EB 5129 (UCB Chemicals), CN2920 (Sartomer Co.), CN3211 (Sartomer Co.), and the like, and acrylated epoxy oligomers, such as EB 600 (UCB Chemicals), EB 3411 (UCB Chemicals), CN2204 (Sartomer Co.), CN110 (Sartomer Co.), and the like. Specific examples of suitable acrylated monomers include polyacrylates, such as trimethylol propane triacrylate, pentaerythritol tetraacrylate, pentaerythritol triacrylate, dipentaerythritol pentaacrylate, glycerol propoxy triacrylate, tris(2-hydroxyethyl) isocyanurate triacrylate, pentaacrylate ester, and the like, epoxy acrylates, urethane acrylates, amine acrylates, acrylic acrylates, and the like. Mixtures of two or more materials may also be employed as the reactive monomer. Suitable reactive monomers are commercially available from, for example, Sartomer Co., Inc., Henkel Corp., Radcure Specialties, and the like. The monomers may be monoacrylates, diacrylates, or polyfunctional alkoxylated or polyalkoxylated acrylic monomers comprising one or more di- or tri-acrylates. Suitable monoacrylates are, for example, cyclohexyl acrylate, 2-ethoxy ethyl acrylate, 2-methoxy ethyl acrylate, 2(2-ethoxyethoxy)ethyl acrylate, stearyl acrylate, tetrahydrofurfuryl acrylate, octyl acrylate, lauryl acrylate, behenyl acrylate, 2-phenoxy ethyl acrylate, tertiary butyl acrylate, glycidyl acrylate, isodecyl acrylate, benzyl acrylate, hexyl acrylate, isooctyl acrylate, isobornyl acrylate, butanediol monoacrylate, ethoxylated phenol monoacrylate, oxyethylated phenol acrylate, monomethoxy hexanediol acrylate, beta-carboxy ethyl acrylate, dicyclopentyl acrylate, carbonyl acrylate, octyl decyl acrylate, ethoxylated nonylphenol acrylate, hydroxyethyl acrylate, hydroxyethyl methacrylate, and the like. Suitable polyfunctional alkoxylated or polyalkoxylated acrylates are, for example, alkoxylated, such as, ethoxylated, or propoxylated, variants of the following; neopentyl glycol diacrylates, butanediol diacrylates, trimethylolpropane triacrylates, glyceryl triacrylates, 1,3-butylene glycol diacrylate, 1,4-butanediol diacrylate, diethylene glycol diacrylate, 1,6-hexanediol diacrylate, tetraethylene glycol diacrylate, triethylene glycol diacrylate, tripropylene glycol diacrylate, polybutanediol diacrylate, polyethylene glycol diacrylate, propoxylated neopentyl glycol diacrylate, ethoxylated neopentyl glycol diacrylate, polybutadiene diacrylate, and the like. In embodiments, the monomer is a propoxylated neopentyl glycol diacrylate, such as, for example, SR-9003 (Sartomer Co., Inc., Exton, Pa.). Suitable reactive monomers are likewise commercially available from, for example, Sartomer Co., Inc., Henkel Corp., Radcure Specialties, and the like.

Suitable photoinitiators are UV photoinitiators such as hydroxycyclohexylphenyl ketones; other ketones such as alpha-amino ketone and 4-(2-hydroxyethoxy)phenyl-(2-hydroxy-2-propyl)ketone; benzoins; benzoin alkyl ethers; benzophenones, such as 2,4,6-trimethylbenzophenone and 4-methylbenzophenone; trimethylbenzoylphenylphosphine oxides such as 2,4,6-trimethylbenzoyl-diphenyl-phosphine oxide; azo compounds; anthraquinones and substituted anthraquinones, such as, for example, alkyl substituted or halo substituted anthraquinones; other substituted or unsubstituted polynuclear quinines; acetophenones, thioxanthones; ketals; acylphosphines; and mixtures thereof. Other examples of photoinitiators include 2-hydroxy-2-methyl-1-phenyl-propan-1-one and 2-isopropyl-9H-thioxanthen-9-one. Desirably, the photoinitiator is one of the following compounds or a mixture thereof: a hydroxycyclohexylphenyl ketone, such as, for example, 1-hydroxycyclohexylphenyl ketone, such as, for example, IRGACURE 184 (Ciba-Geigy Corp.), a trimethylbenzoylphenylphosphine oxide, such as, for example, ethyl-2,4,6-trimethylbenzoylphenylphosphinate, such as, for example, LUCIRIN TPO-L (BASF Corp.), a mixture of 2,4,6-trimethylbenzophenone and 4-methylbenzophenone, such as, for example, SARCURE SR1137 (Sartomer); a mixture of 2,4,6-trimethylbenzoyl-diphenyl-phosphine oxide and 2-hydroxy-2-methyl-1-phenyl-propan-1-one, such as, for example, DAROCUR 4265 (Ciba Specialty Chemicals); alpha-amino ketone, such as, for example, IRGACURE 379 (Ciba Specialty Chemicals); 4-(2-hydroxyethoxy)phenyl-(2-hydroxy-2-propyl)ketone, such as, for example, IRGACURE 2959 (Ciba Specialty Chemicals); 2-isopropyl-9H-thioxanthen-9-one, such as, for example, DAROCUR ITX (Ciba Specialty Chemicals); and mixtures thereof.

Optional additives include, but are not limited to, light stabilizers, UV absorbers, that absorb incident UV radiation and convert it to heat energy that is ultimately dissipated, antioxidants, optical brighteners, that may improve the appearance of the image and mask yellowing, thixotropic agents, dewetting agents, slip agents, foaming agents, antifoaming agents, flow agents, waxes, oils, plasticizers, binders, electrical conductive agents, organic and/or inorganic filler particles, leveling agents, for example, agents that create or reduce different gloss levels, opacifiers, antistatic agents, dispersants, pigments and dyes, and the like. The composition may also include an inhibitor, such as, a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating an overprint composition using optional additives.

The above components of the overcoat composition may be suitably mixed in any desired amount to provide a desired composition. For example, the UV curable overcoat may contains from about 20 to about 95 wt % reactive monomer, from about 0 to about 30 wt % reactive oligomer, from about 0.5 to about 15 wt % UV photoinitiator, and from about 0 to about 60 wt % wax.

A resin coating on the pigment, described above, may or may not alone be sufficient for fusing/adherence of the pigment particles to a substrate. Thus, in embodiments, the pigments may be used in conjunction with a clear toner that provides additional fusing/adherence, as detailed above.

While a particular type of printing apparatus is described herein, it will be understood by one of ordinary skill in the art that the present disclosure may be applied to any type of digital printing apparatus.

Figure 2:
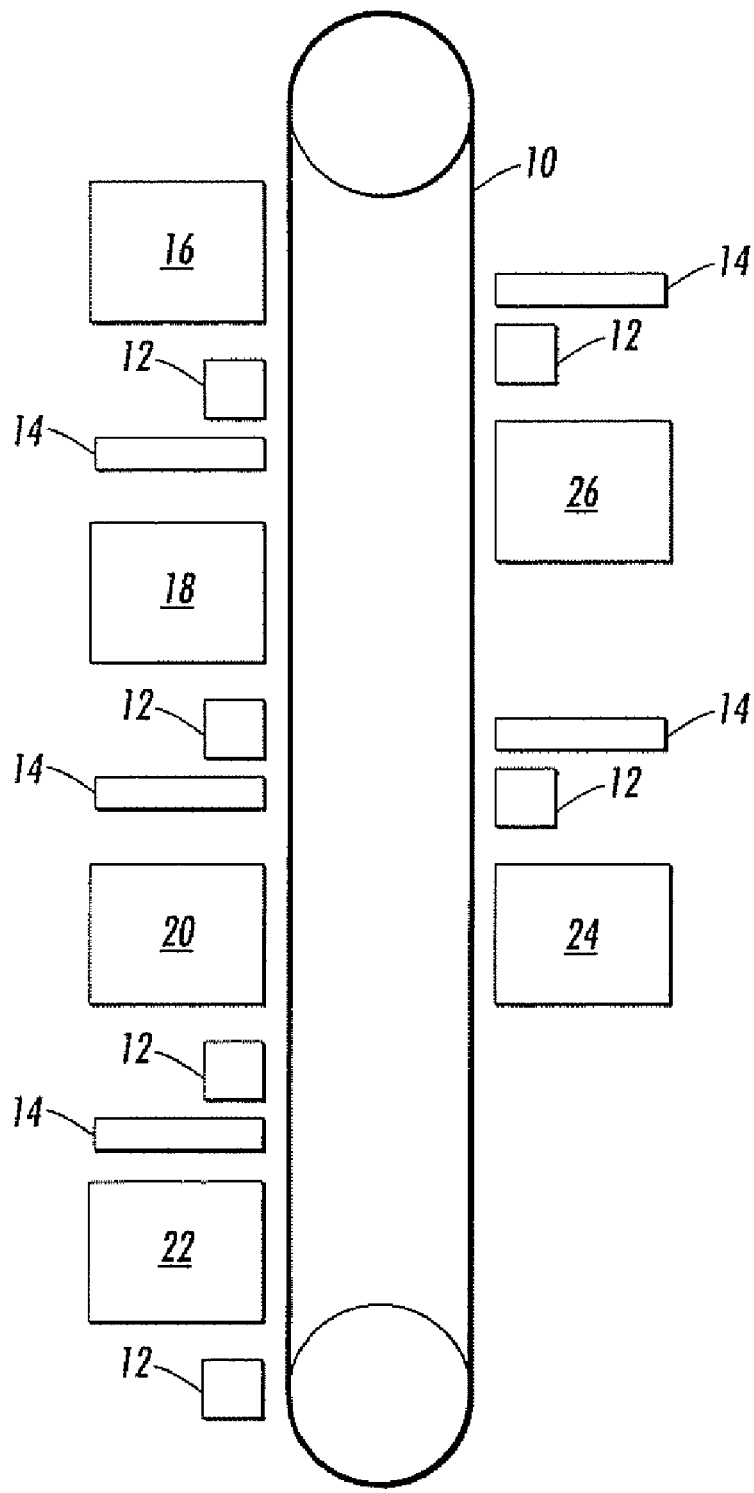
FIG. 2 is a simplified elevation view showing basic elements of a multi-color xerographic printing system that may be used in accordance with the present disclosure.

FIG. 2 is a simplified elevation view showing portions of a xerographic engine suitable for image-on-image printing of full-color special effect images. In the particular architecture shown in FIG. 2, a series of developer stations successively lay down different colored toners and resin-coated pigments (described in further detail below) on a single photoreceptor, and the accumulated different toners and resin-coated pigments are then transferred to a print sheet, such as a sheet of paper. As shown in FIG. 2, a photoreceptor belt 10 is entrained around a series of rollers, and along the circumference of the photoreceptor belt 10 are disposed a series of charging devices, each indicated as 12, exposure devices indicated as 14, which, as known in the art, could comprise for example an independent laser scanner or LED print bar, and developer stations 16, 18, 20, 22, 24 and 26, which apply appropriately-charged toner and/or resin-coated pigments to the suitably charged or discharged areas created by exposure device 14. While a six-station device is shown, as few as two stations may be used (for example, a first for single color toner such as black and a second for the metallic/pearlescent pigments). A five-station device may also be used as detailed below. In embodiments, additional stations may also be added for additional colors, where desired.

A person of ordinary skill in the art of xerographic printing will appreciate that each of combinations of charge device 12, exposure device 14, and development stations 16, 18, 20, 22, 24 and 26 along the circumference of photoreceptor 10 represents an "image station" capable of placing toner of a particular primary or other color, or a resin-coated specialty pigment, in imagewise fashion on the photoreceptor 10. The location of where these colors or resin-coated pigments are to be placed will, of course, be determined by the various areas discharged by the series of exposure devices 14. There may also be, disposed along photoreceptor belt 10, any number of ancillary devices, such as cleaning corotrons, cleaning blades, and the like, as would be known to one of skill in the art. By causing a particular image area on the photoreceptor belt 10 to be processed by a number of stations, each station corresponding to a color or a resin-coated pigment, it is apparent that a full-color image, comprising imagewise-placed toners of the different primary colors with special effect imaging capabilities, will eventually be built-up on photoreceptor 10. This built-up full-color special effect image is then transferred to a print sheet, such as at transfer corotron, and then the print sheet is fused to fix the full-color special effect image thereon.

In embodiments, instead of using a single photoreceptor belt, each station may include a photoreceptor, and each image developed in each station may be transferred to an intermediate member (belt or drum) substrate, desirably in registration, and then ultimately transferred to a final substrate such as paper. Such a device would be similar to that shown in FIG. 2, with belt 10 being the intermediate member substrate.

Each station will include a housing for containing the developer material to be used in developing a latent image on the photoreceptor. The developer material may either be a color toner, or may be the pearlescent or metallic coated pigments.

In embodiments, any color toner may be added before or after the metallic/pearlescent pigments. Thus, at least one housing that includes the pigments and one housing that includes any color toner, such as clear or black, is included in the system (a basic two housing system). As discussed in detail below, if a full color system is used, typically at least five houses are needed, one for each of the conventional cyan, magenta, yellow and black (CMYK) toners, and one for the metallic/pearlescent pigments.

In a full-color printing system capable of print special effect images, an example of which is shown in the Figure, there are provided, in addition to the various primary-color imaging stations such as CMYK, at least one additional imaging station containing a blend of pearlescent or metallic resin-coated and/or charge additive-coated pigments, optionally also including clear toner in the additional housing. The device may alternatively include a further additional imaging station for separate application of clear toner. These stations may be in either order (clear first, or pigment first). Thus, there may be at least six imaging stations, consisting of not only the CMYK imaging stations, but the two additional imaging stations for the pearlescent or metallic coated pigments, and for the clear toner. Still further imaging stations for highlight colors may also be added.

In the special effect printing process described herein, the pearlescent or metallic coated pigment may be placed on top of a base coat. So, for example, a metallic pigment is layered onto white for a silver finish, or a red for a bronze finish. To achieve this, the metallic pigment toner is developed from a $5^{th}$ housing and white or red toner may be developed from a $6^{th}$ housing (the order may be reversed, as the last toner developed is closest to the paper, and will end up on the bottom). Thus, on fusing the white or red toner, the resin on the pigments and toner melt together and fuse the entire image to the paper. In embodiments, a clear toner is developed from the $6^{th}$ housing and the resin-coated pearlescent or metallic pigment is developed in the $5^{th}$ housing. Thus, as just described above, upon fusing, the clear toner aids to fuse all of the toner/pigments to the image. The clear toner may also be developed in the $5^{th}$ housing with the pearlescent or metallic resin-coated pigment developed in the $6^{th}$ housing.

In further embodiments, a clear toner and pearlescent or metallic coated pigments are printed as a blend from the $5^{th}$ or $6^{th}$ housing, the clear toner in the blend providing additional resin to fuse the image together. In embodiments, if the pearlescent or metallic toner, which may or may not also include a clear toners is printed from the $6^{th}$ housing and additional clear toner is developed from the $5^{th}$ housing to provide an additional protective layer on top of the metallic image. In further embodiments, a clear coat, such as an ultra violet curable overcoat, may be added on the top of the image to secure the pigmented toner to the substrate. This overcoat, could be in addition to a clear toner from a $5^{th}$ or $6^{th}$ housing, or a blend of the pearlescent or metallic "toner" in the $5^{th}$ housing. However, one of ordinary skill in the art will appreciate that many different combinations are possible and well within the scope of the disclosure.

As mentioned above, there is currently no way to include large size specialty pigments with toner, either conventionally or by an emulsion aggregation (EA) process with the necessary size of pearlescent or metallic pigments because, in a EA process, tile large pigments would be rejected. Thus, in order to overcome this problem, a process is described herein that allows specialty pigments to be applied separately from toner. For example, the specialty pigments may be provided in conjunction with a resin coating to secure desired electrification-maintaining properties and environmental stability. However, CCAs may also be applied to the specialty pigments either in conjunction with a resin coat, or without the resin coat.

Example

FIG. 1 illustrates of an epoxy group on a polyester chain providing a reactive site for formation of a covalent bond with a primary amine as the functional group of a functionalized silicon dioxide ($SiO_2$) nanoparticle, wherein "n" represents a number of repeat units in a polymer chain. For example, if n=4, then there are 4 $CH_2$ units in a row, such as $CH_2CH_2CH_2CH_2$. In the above example, "m" and "p" are also used to designate the number of repeat units in the polymer chain. The variables "m" and "p" may be any number, so long as both are not zero. For example, "m" and "p" may individually be from 0 to about 500 or more. The variable "n" may be any suitable number of 1 or more, such as from about 1 to about 500 or more.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A pigment particle comprising
a pearlescent or metallic pigment base particle having at least one surface additive on a surface of the pearlescent or metallic pigment base particle;
wherein the at least one surface additive is a metal oxide particle coated with and covalently bonded to at least one polycondensation polymer.

2. The pigment particle according to claim 1, wherein the pearlescent or metallic pigment base particle has an average size of from about 5 to about 50 microns.

3. The pigment particle according to claim 1, wherein the polycondensation polymer is a polyester.

4. The pigment particle according to claim 3, wherein the polyester has an acid value of from about 13 mg/eq. KOH to about 40 mg/eq. KOH.

5. The pigment particle according to claim 3, wherein the covalent bond is between a functional group on a surface of the metal oxide particle and a functional group of the polyester.

6. The pigment particle according to claim 5, wherein the functional group of the polyester is selected from the group consisting of amine, hydroxyl, epoxide, and carboxylic acid.

7. The pigment particle according to claim 3, wherein the covalent bond is between an amine functional group on the surface of the metal oxide particle and an epoxide functional group of the polyester, or the covalent bond is between an epoxide functional group on the surface of the metal oxide particle and a carboxylic acid functional group of the polyester.

8. The pigment particle according to claim 3, wherein the polyester is a linear amorphous polyester resin or a branched amorphous polyester resin.

9. The pigment particle according to claim 3, wherein the polyester is selected from the group consisting of poly(1,2-propylene-diethylene)terephthalate, polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene-sebacate, polybutylene-sebacate, polyethylene-adipate, polypropylene-adipate, polybutylene-adipate, polypentylene-adipate, polyhexalene-adipate polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate, polyethylene-pimelate, polypropylene-pimelate, polybutylene-pimelate, polypentylene-pimelate, polyhexalene-pimelate, polyheptadene-pimelate, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and mixtures thereof.

10. The pigment particle according to claim 1, wherein the metal oxide particle has an average size of from about 3 nm to about 700 nm.

11. The pigment particle according to claim 1, wherein the metal oxide particle is selected from the group consisting of silicon dioxide, titanium dioxide and mixtures thereof.

12. The pigment particle according to claim 1, wherein the metal oxide particle has an average size of from about 10 nm to about 50 nm.

13. The pigment particle according to claim 1, further comprising carrier particles.

14. The pigment particle according to claim 1, wherein the pigment particle is mixed with clear toner particles, and wherein the amount of clear toner particles mixed with the pigment particles is from about 20 to about 80 weight percent of the mixture.

15. A developer comprising:
a pigment particle comprising a pearlescent or metallic pigment base particle having at least one surface additive on a surface of the pearlescent or metallic pigment base particle;
wherein the at least one surface additive is a metal oxide particle coated with and covalently bonded to at least one polycondensation polymer.

16. The developer according to claim 15, further comprising a carrier.

17. The developer according to claim 16, wherein the carrier includes a carrier core selected from the group consisting of granular zircon, granular silicon, glass, steel, nickel, ferrites, magnetites, iron ferrites, silicon dioxide.

18. A method of making a pigment particle comprising:
with a pearlescent or metallic pigment base particle having at least one surface additive on a surface of the pearlescent or metallic pigment base particle, the at least one surface additive being a metal oxide particle, functionalizing a surface of the metal oxide particle on the pearlescent or metallic pigment base particle to form a functionalized group on the surface of the metal oxide particle; and
covalently bonding a polycondensation polymer with the functionalized group of the metal oxide particle.

19. The method according to claim 18, wherein the metal oxide particle is a nano-sized metal oxide particle.

20. The method according to claim 18, wherein the polycondensation polymer is a polyester.

21. The method according to claim 18, wherein the metal oxide particle is selected from the group consisting of silicon dioxide, titanium dioxide and mixtures thereof.

22. The method according to claim 18, further comprising, prior to the covalently bonding, functionalizing the polycondensation polymer to include a functional group for covalently bonding with the functional group of the metal oxide particle.

* * * * *